(12) United States Patent
Oshita et al.

(10) Patent No.: US 7,527,295 B2
(45) Date of Patent: May 5, 2009

(54) ENERGY ABSORBING STEERING COLUMN (75) Inventors: Morito Oshita, Kariya (JP); Hidetoshi Inayoshi, Nukata-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 187 days.

(21) Appl. No.: 11/635,646

(22) Filed: Dec. 8, 2006

(65) Prior Publication Data

US 2007/0151392 A1    Jul. 5, 2007

(30) Foreign Application Priority Data

Dec. 21, 2005  (JP) ............................. 2005-368033

(51) Int. Cl.
*B60D 1/00*  (2006.01)

(52) U.S. Cl. .................................... 280/777

(58) Field of Classification Search ................ 280/777; 74/492, 493

See application file for complete search history.

(56) References Cited

U.S. PATENT DOCUMENTS

| | | | | |
|---|---|---|---|---|
| 3,788,148 A | * | 1/1974 | Connell et al. ................ | 74/492 |
| 3,815,438 A | * | 6/1974 | Johnson ....................... | 74/492 |
| 3,877,319 A | * | 4/1975 | Cooper ......................... | 74/492 |
| 5,314,204 A | * | 5/1994 | DuRocher et al. ........... | 280/777 |
| 5,722,300 A | * | 3/1998 | Burkhard et al. ............. | 74/492 |
| 6,109,652 A | * | 8/2000 | Kim et al. ..................... | 74/492 |
| 2004/0104567 A1 | * | 6/2004 | Kinme et al. ................ | 280/777 |

FOREIGN PATENT DOCUMENTS

| | | |
|---|---|---|
| JP | 10-217980 A | 8/1998 |
| JP | 3611885 B2 | 10/2004 |

* cited by examiner

*Primary Examiner*—John Q. Nguyen
*Assistant Examiner*—Robert A. Coker
(74) *Attorney, Agent, or Firm*—Buchanan Ingersoll & Rooney PC (57)    ABSTRACT

An energy absorbing steering column includes a first cylindrical member for rotatably supporting a steering shaft of a vehicle, the first cylindrical member including a first press-fit portion formed on an outer surface thereof, a second cylindrical member for normally supporting the first cylindrical member at a predetermined position, the second cylindrical member including a first supporting portion formed on an inner surface thereof, and a metallic elastic bush provided between the first press-fit portion and the first supporting portion for applying elastic force in a radial direction to restrict an axial movement of the first cylindrical member relative to the second cylindrical member. The metallic elastic bush allows the axial movement of the first cylindrical member relative to the second cylindrical member when a load applied to the steering shaft is equal to or larger than a predetermined value.

11 Claims, 7 Drawing Sheets

ENERGY ABSORBING STEERING COLUMN

CROSS REFERENCE TO RELATED APPLICATIONS

This application is based on and claims priority under 35 U.S.C. § 119 to Japanese Patent Application 2005-368033, filed on Dec. 21, 2005, the entire content of which is incorporated herein by reference.

FIELD OF THE INVENTION

This invention generally relates to an energy absorbing steering column. More specifically, this invention pertains to an energy absorbing steering column, which absorbs energy applied to a steering shaft of a vehicle.

BACKGROUND

An energy absorbing steering column has a steering column, which has a property to absorb energy. Such an energy absorbing steering column provided in a vehicle is widely known as a means for decreasing shock to a steering wheel. Various structures of the energy absorbing steering columns are widely employed. For example, a ball type, a mesh type, a silicon rubber type, or the like, are utilized. As for the ball type, a ball is provided between an outer tube and an inner tube of a steering column. In the mesh type, a metallic mesh structure is utilized for a steering column. In the silicon rubber type, a silicon rubber is sealed in a lower tube so that the silicon rubber is ejected from a slit when an upper tube moves into the lower tube.

JP3611885B2 (Patent document 1) describes "a shock absorbing steering column, in which a second cylindrical column is fit in a first cylindrical column through a cylindrical spacer and shock energy is absorbed by a relative movement of both columns in an axial direction" as a conventional technique. The Patent document 1 suggests the cylindrical spacer to be as follows. "In the shock absorbing steering column, in which the second cylindrical column is fit in the first cylindrical column through the cylindrical spacer, the spacer is made of synthetic resin material and includes plural protruding portions formed at least one of at an outer circumference and an inner circumference. At least one of an inner circumference of the first column and an outer circumference of the second column contacts the spacer through the protruding portions." Further, a dimension of the spacer is determined in the Patent document 1.

Further, JPH10(1998)-217980A (Patent document 2) suggests a safety steering column, "in which a material weakening portion is formed so as to be provided at an end portion of a column tube over a circumferential surface, the end portion extending into a passenger compartment, a cone-shaped configuration member is provided adjacent to and coaxially with the end portion of the column tube, a minimum outer diameter of the cone-shaped configuration member corresponds to an inner diameter of the end portion of the column tube and the minimum outer diameter portion of the cone-shaped configuration member faces the end portion of the column tube".

In the steering column described in the Patent document 1, the spacer made of synthetic resin material is provided between the first cylindrical column and the second cylindrical column. The Patent document describes that, even when the spacer made of synthetic resin material is utilized, a relative inclination of both columns caused by deformation of the protruding portions can be small by determining dimensions of the spacer to certain values. However, a load for starting a movement determined by the spacer made of synthetic resin material is easily affected by change with time and temperature change. In particular, in the Patent document 1, because the spacer made of synthetic resin material is fit-in in a state where the spacer is deformed, deterioration in rigidity with time or heat is of great concern. Further, in the steering column described in the Patent document 1, it is difficult to separately set the load for starting the movement and a load during the movement in the relative movement of both columns in an axial direction.

Further, in the steering column described in the Patent document 2, because a load for starting a movement and a load during the movement of the cone-shaped configuration member are determined from a load of the material weakening portion (for example, a notch) provided over the circumferential surface of the column tube, it is difficult to separately set the load for starting the movement and the load during the movement of the column tube. Further, a dimension in an axial direction necessarily becomes large, which causes low space efficiency and large size, and in turn impracticality. In the meantime, as a cylindrical member for configuring an energy absorbing steering column, various terms, "outer tube" and "inner tube" described above, "first column" and "second column" described in the Patent document 1, or the like, are utilized. Terms "first cylindrical member", "second cylindrical member", "outer tube" and "inner tube" will be utilized hereinafter.

A need thus exists for an energy absorbing steering column, in which a load for starting an axial movement of a first cylindrical member relative to a second cylindrical member can be simply and appropriately set. The present invention has been made in view of the above circumstances and provides such an energy absorbing steering column.

SUMMARY OF THE INVENTION

According to an aspect of the present invention, an energy absorbing steering column includes a first cylindrical member for accommodating a steering shaft of a vehicle and rotatably supporting the steering shaft about an axis thereof, the first cylindrical member including a first press-fit portion formed on an outer surface thereof at a predetermined distance in an axial direction from a front open end of the first cylindrical member relative to the vehicle, a second cylindrical member for accommodating the first cylindrical member and normally supporting the first cylindrical member at a predetermined position, the second cylindrical member including a first supporting portion formed on an inner surface thereof near a rear open end of the second cylindrical member relative to the vehicle, and a metallic elastic bush provided between the first press-fit portion and the first supporting portion for applying elastic force in a radial direction for biasing the first press-fit portion and the first supporting portion in the radial direction for supporting the steering shaft to restrict an axial movement of the first cylindrical member relative to the second cylindrical member. The metallic elastic bush allows the axial movement of the first cylindrical member relative to the second cylindrical member when a load applied to the steering shaft is equal to or larger than a predetermined value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
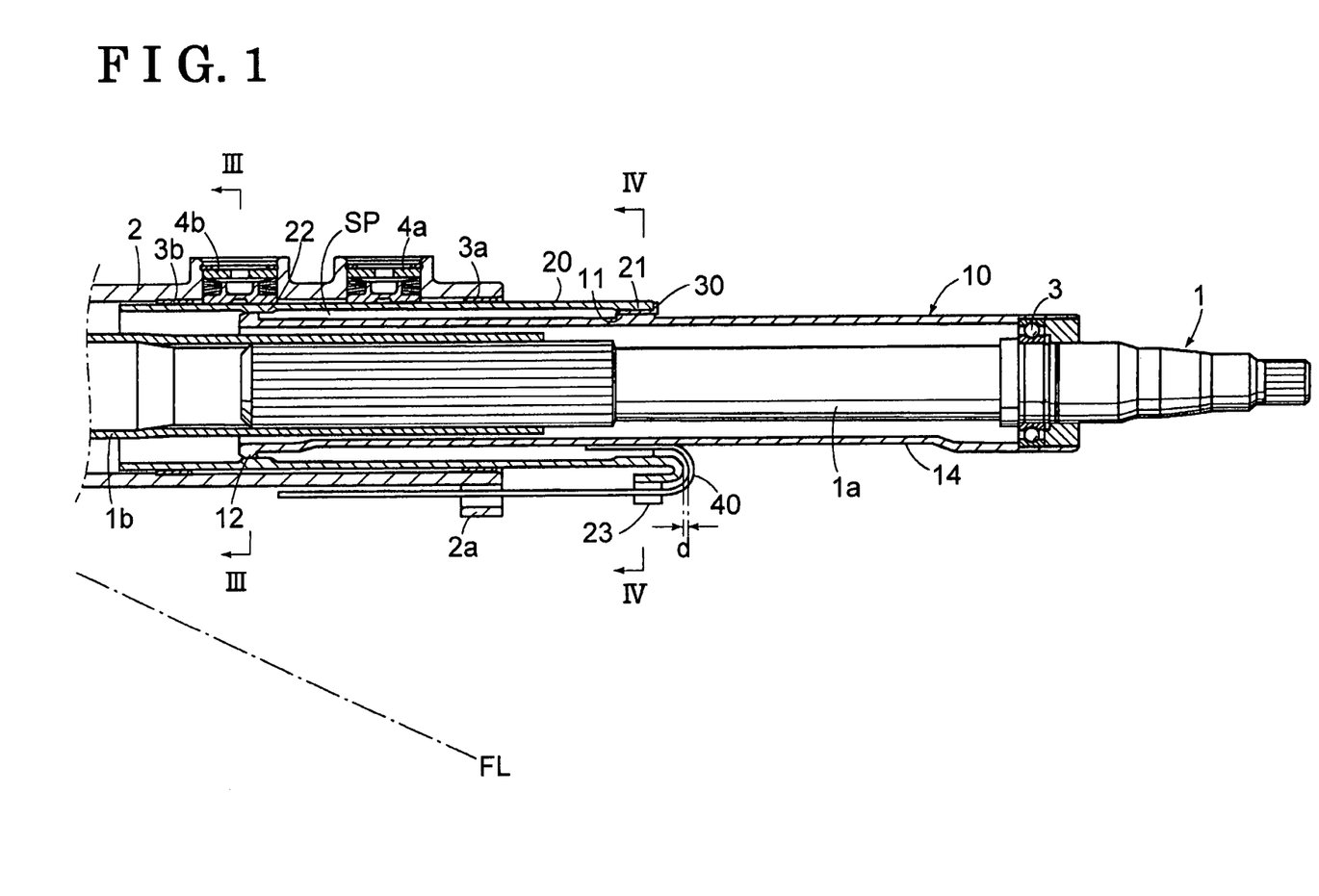
FIG. 1 represents a transverse cross-sectional view illustrating an energy absorbing steering column according to an embodiment of the present invention.

An embodiment of the present invention will be explained with reference to drawing figures. FIG. 1 represents a diagram illustrating a configuration of an energy absorbing steering column according to the embodiment of the present invention. A steering shaft 1 includes an upper shaft 1a and a cylindrical lower shaft 1b. A steering wheel (not illustrated) is connected to a rear end of the steering shaft 1. The lower shaft 1b is connected to a front end portion of the upper shaft 1a through splines. In other words, the upper shaft 1a is connected to the lower shaft 1b in a way that the upper shaft 1a is axially movable relative to the lower shaft 1b. A front end portion of the lower shaft 1b is connected to a steering mechanism (not illustrated). The steering shaft 1 is supported by a vehicle body (not illustrated) through a column housing 2 and a bracket (not illustrated) so that an angle of the steering shaft 1 from a floor surface FL indicated by a dashed line in FIG. 1 is a predetermined angle (for example, 25 degrees).

Figure 2:
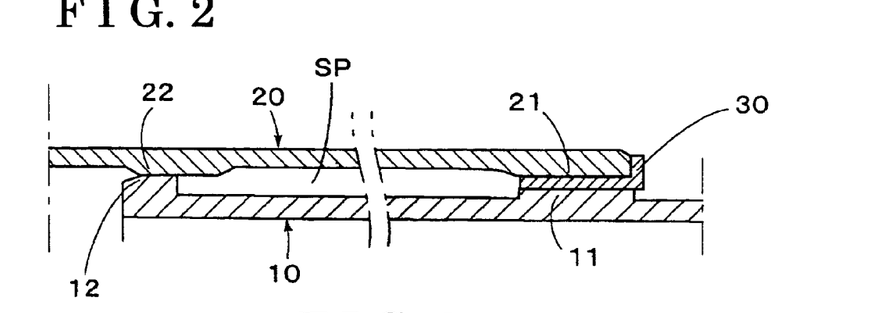
FIG. 2 represents an enlarged cross-sectional view illustrating a relation between an inner tube and an outer tube of FIG. 1.
Figure 3:
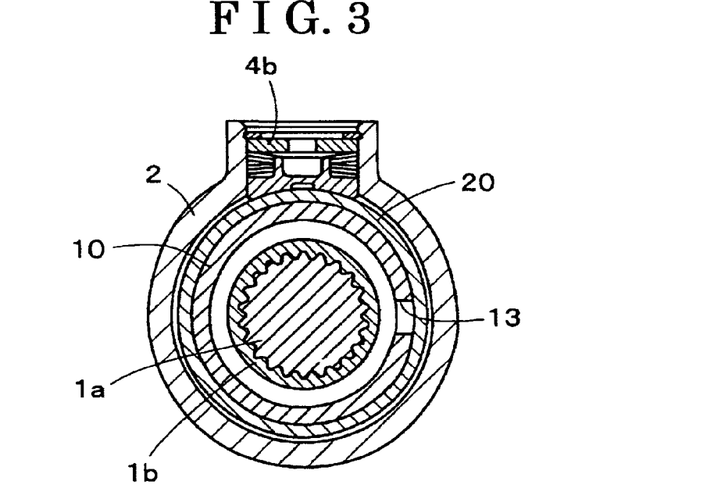
FIG. 3 represents a cross-sectional view taken on line III-III of FIG. 1.

A metallic inner tube 10 is provided in the column housing 2. The inner tube 10 serves as a first cylindrical member for accommodating and rotatably supporting the steering shaft 1 about the axis thereof. In other words, the upper shaft 1a accommodated in the inner tube 10 is rotatably supported by a rear end portion of the inner tube 10 through a bearing 3. An axial movement of the upper shaft 1a relative to the inner tube 10 is restricted. The upper shaft 1a and the inner tube 10 can move in an axial direction as a unit. Further, a metallic outer tube 20 is provided as a second cylindrical member for accommodating the first cylindrical member and normally supporting the first cylindrical member at a predetermined position. Then, in a situation where a load applied to the steering shaft 1 is equal to or larger than a predetermined value, an axial movement of the inner tube 10 relative to the outer tube 20 (axial movement of the upper shaft 1a) is allowed. The inner tube 10 and the outer tube 20 are configured as illustrated in FIG. 2, which illustrates an enlarged view thereof. The inner tube 10, the outer tube 20 and a metallic elastic bush 30, or the like, function as an energy absorbing means.

The outer tube 20 is supported by the column housing 2 through bearings 3a and 3b. The outer tube 20 is pressed by and supported at an inner surface of the column housing 2 by friction mechanisms 4a and 4b with use of a coned disc spring. Accordingly, slidability of the steering wheel (not illustrated) in a thrust direction can be ensured without generation of looseness. Further, the outer tube 20 is connected to a telescopic mechanism (not illustrated). Relation between the column housing 2 and the outer tube 20 does not function as the energy absorbing means.

In this embodiment, a first supporting portion 21 is formed on an inner surface of the outer tube 20 near a rear (relative to the vehicle) open end (referred as a rear open end hereinafter) thereof. A second supporting portion 22 is formed on the inner surface of the outer tube 20 at a position by a predetermined distance apart from the first supporting portion 21 in an axial direction. Each of the first supporting portion 21 and the second supporting portion 22 is configured from a ring-shaped protruding portion extending from the outer tube 20 toward an axis core thereof. Each of the first supporting portion 21 and the second supporting portion 22 is formed on the inner surface of the outer tube 20 as a unit. As a result, a ring-shaped space SP is formed between the first supporting portion 21 and the second supporting portion 22. It is possible to form the first supporting portion 21 and the second supporting portion 22 by cutting the inner surface of the cylindrical outer tube 20.

Figure 4:
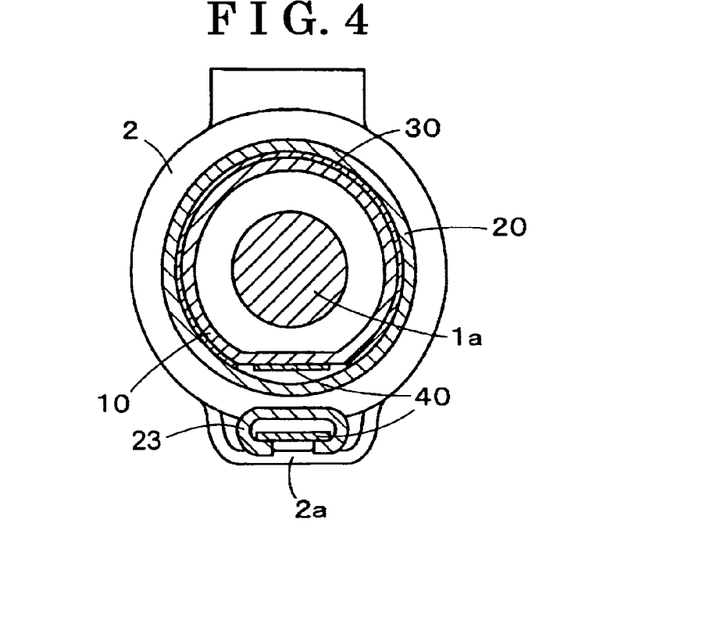
FIG. 4 represents a cross-sectional view taken on line IV-IV of FIG. 1.
Figure 5:
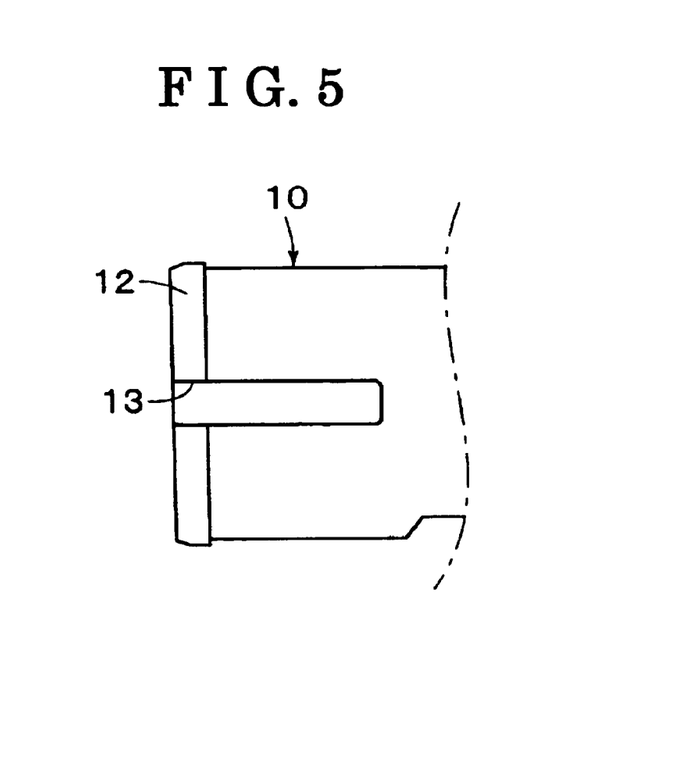
FIG. 5 represents a front view illustrating the inner tube near a front open end thereof according to the embodiment of the present invention.
Figure 6:
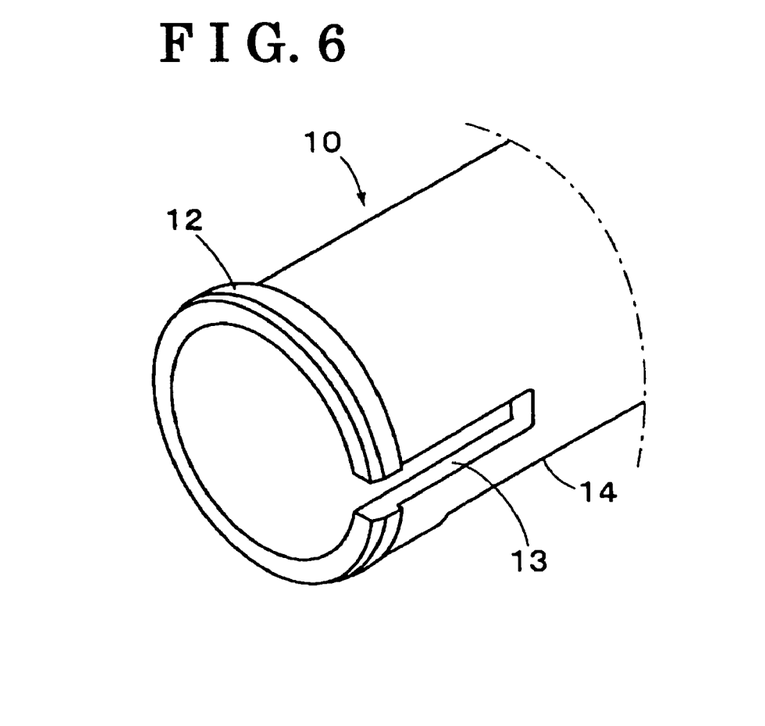
FIG. 6 represents a perspective view illustrating the inner tube near the front open end thereof according to the embodiment of the present invention.
Figure 7:
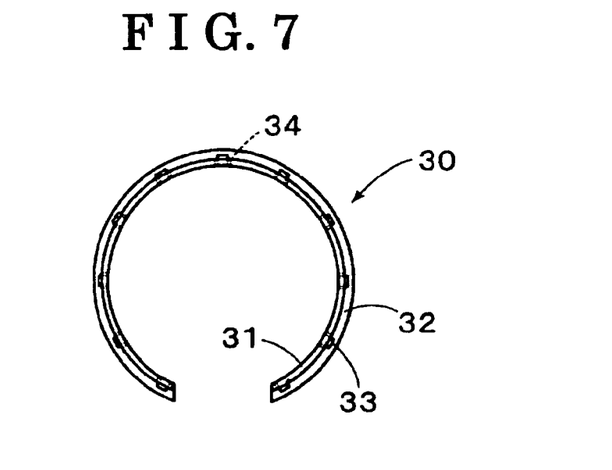
FIG. 7 represents a side view illustrating a metallic elastic bush according to the embodiment of the present invention.
Figure 8:
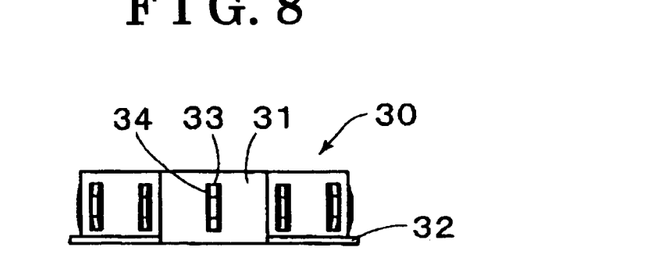
FIG. 8 represents a front view illustrating the metallic elastic bush according to the embodiment of the present invention.
Figure 9:
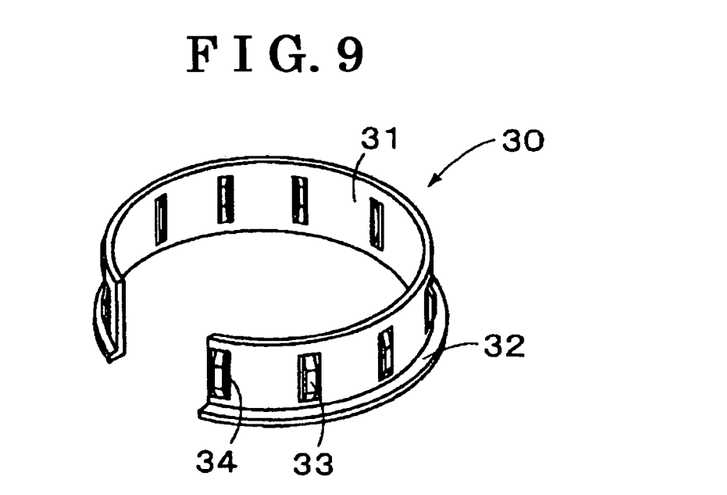
FIG. 9 represents a perspective view illustrating the metallic elastic bush according to the embodiment of the present invention.

On the other hand, a second press-fit portion 12 is formed on an outer surface of the inner tube 10 near a front (relative to the vehicle) open end (referred to as a front open end hereinafter) thereof. A first press-fit portion 11 is formed on the outer surface of the inner tube 10 at a predetermined distance in an axial direction from the second press-fit portion 12. Each of the first press-fit portion 11 and the second press-fit portion 12 according to the embodiment is configured from a ring-shaped protruding portion extending in a radial direction of the inner tube 10. Each of the first press-fit portion 11 and the second press-fit portion 12 is formed on the outer surface of the inner tube 10 as a unit. Further, as illustrated in FIG. 5 and FIG. 6, a slit 13 is formed as a notch portion formed by cutting the inner tube 10 near the front open end by a predetermined area including a part of the second press-fit portion 12 in an axial direction. Accordingly, the second press-fit portion 12 can be fitted in the second supporting portion 22 by a comparatively low load. Further, as illustrated in FIG. 1 and FIG. 4, the metallic elastic bush 30 is provided between the first press-fit portion 11 and the first supporting portion 21. The metallic elastic bush 30 applies elastic force in a radial direction.

Figure 10:
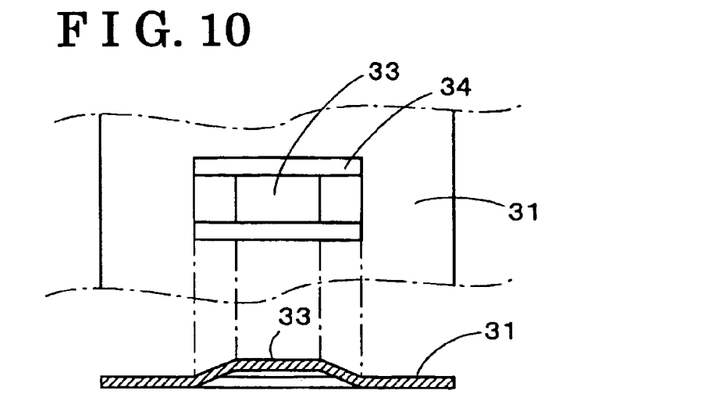
FIG. 10 represents a plane view and a cross-sectional view illustrating a spring portion of the metallic elastic bush according to the embodiment of the present invention.

The metallic elastic bush 30 according to the embodiment is made of for example, a stainless steel. The metallic elastic bush 30 is formed in a shape illustrated in FIG. 7 to FIG. 10. The metallic elastic bush 30 includes a cylindrical portion 31 and a flange portion 32. The cylindrical portion 31 has an opening along an axial direction thereof. In other words, the cylindrical portion 31 has a C-shape in cross-section. The flange portion 32 outwardly extends from an opening axial end of the cylindrical portion 31 in a radial direction. Plural spring portions (representatively indicated by 33) are formed at the cylindrical portion 31 in a circumferential direction. The flange portion 32 has a function to inhibit a thrust movement (leftward in FIG. 1) of the metallic elastic bush 30. The spring portions 33 according to the embodiment are, as illustrated in FIG. 10, protruding portions outwardly extending from the cylindrical portion 31 in a radial direction. Each of the spring portions are formed between plural slits (representatively indicated by 34), which serve as axial openings formed at the cylindrical portion 31 at predetermined distances in a circumferential direction. The protruding portion of each spring portion 33 is formed to have a trapezoidal cross-sectional shape as illustrated in a lower part of FIG. 10. However, it is also possible to form the protruding portion of each spring portion 33 to have an outwardly curved surface.

As described above, the metallic elastic bush 30 is provided between the first press-fit portion 11 and the first supporting portion 21 as illustrated in FIG. 1 and FIG. 4. At this time, each spring portion 33 is compressed and deformed. Restoring elastic force of each spring portion 33 is applied to the inner tube 10 and the outer tube 20 in a radial direction, in which a clearance therebetween increases. The elastic force ensures frictional force between the metallic elastic bush 30 and the inner tube 10 and frictional force between the metallic elastic bush 30 and the outer tube 20. Accordingly, the steering shaft 1 is supported in a state where the axial movement of the inner tube 10 relative to the outer tube 20 is inhibited. Each spring portion 33 is deformed by a predetermined value. Accordingly, the inner tube 10 is supported by the outer tube 20 without generation of looseness of the steering wheel (not illustrated).

Figure 11:
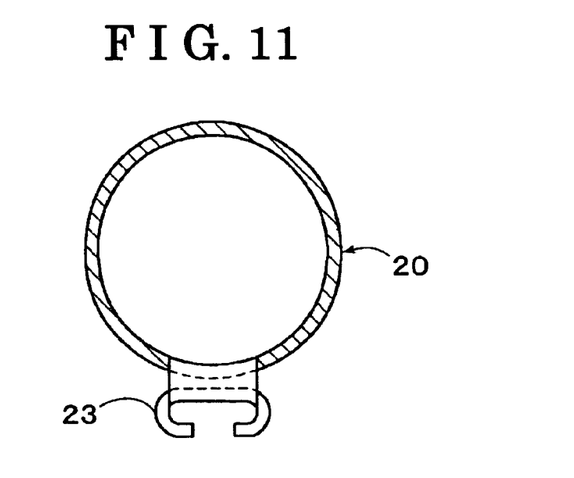
FIG. 11 represents a partial cross-sectional view illustrating the outer tube near a rear open end thereof according to the embodiment of the present invention.
Figure 12:
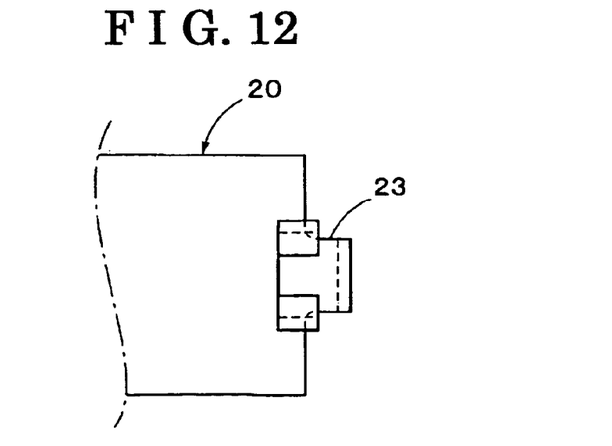
FIG. 12 represents a diagram illustrating a bottom surface of the outer tube near the rear open end thereof according to the embodiment of the present invention.

Further, in this embodiment, as illustrated in FIG. 1, a recessed portion 14 is formed at a lower part of the inner tube 10 over a predetermined area in an axial direction. A plate 40, which serves as an elongated elastic plate member, is provided at the recessed portion 14. A first end of the plate 40 is fixed to the inner tube 10 by welding, a pin, a rivet, or the like. Further, as illustrated in FIG. 11 and FIG. 12, a tongue-shaped portion is formed at a lower portion of the outer tube 20 and extends from the rear open end of the outer tube 20. The tongue-shaped portion is bent so that the tongue-shaped portion is formed in a C-shape, which opens downward as seen from the rear open end. A guiding portion 23 is formed at the tongue-shaped portion as a unit. Further, as illustrated in FIG. 1 and FIG. 4, a guiding portion 2a is formed also at an outer circumferential surface of a rear open end portion of the column housing 2. The guiding portion 2a is positioned on a line parallel to an axis of the inner tube 10. An opening of the guiding portion 2a faces an axial opening (C-shaped opening) of the guiding portion 23. The guiding portion 2a serves as a second guiding portion. In the meantime, though the recessed portion 14 is formed at the inner tube 10 in the above explanation, other configuration can be employed if such a recessed portion is formed relative to the outer tube 20. For example, it is also possible that the inner tube 10 includes a smaller diameter portion in the middle portion thereof, the smaller diameter portion having an outer diameter smaller than an inner diameter of the outer tube 20, and the plate 40 is fixed at the smaller diameter portion.

The guiding portion is not limited to a bent C-shape, which opens downward as seen from the rear (relative to the vehicle) open end side. Any shape can be employed for the guiding portion if the guiding portion includes an insertion opening into which a free end portion side of the plate member can be inserted. For example, an O-shaped guiding portion as seen from the rear (relative to the vehicle) open end side, a C-shaped guiding portion opening laterally as seen from the rear (relative to the vehicle) open end side, or the like, can be employed.

Figure 13:
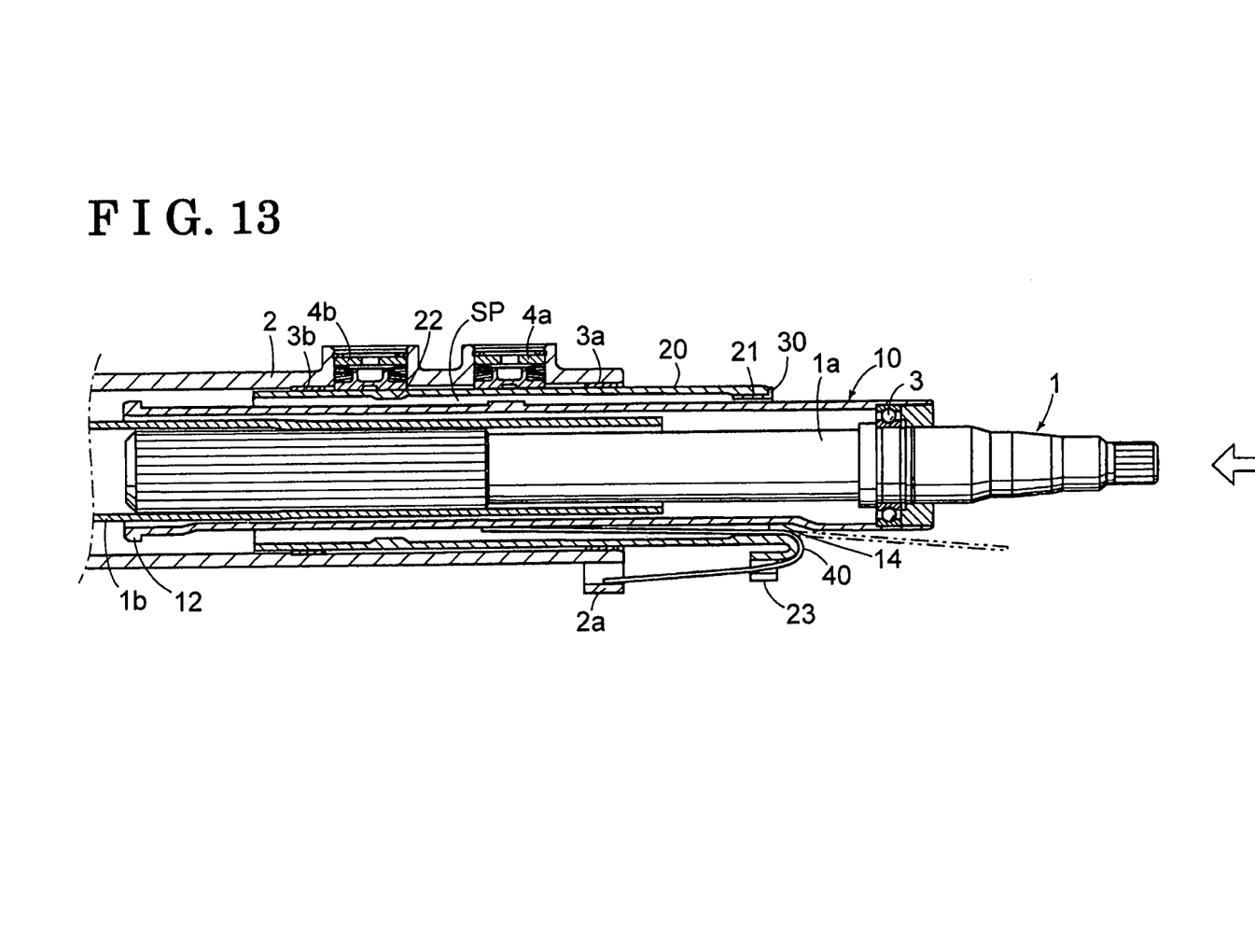
FIG. 13 represents a transverse cross-sectional view illustrating an actuated state of the energy absorbing steering column according to the embodiment of the present invention.

The plate 40 is bent into a U-shape so as to be inserted into the guiding portion 23 and the guiding portion 2a. As illustrated in FIG. 1, a predetermined clearance d is formed between an inner surface of the plate 40 near a fixed portion thereof and an outer surface of the guiding portion 23 at a rear end side thereof. The guiding portion 23 and the guiding portion 2a restrict the plate 40 so that the plate 40 does not turn to a state indicated by a chain double-dashed line illustrated in FIG. 13 in a situation where the inner tube 10 is accommodated in the outer tube 20. In other words, the guiding portion 23 and the guiding portion 2a inhibit a situation, where a predetermined load cannot be obtained. In the meantime, any configuration can be employed if either one or more of the guiding portion 23 and the guiding portion 2a is provided.

Action of the energy absorbing steering column described above will be explained. Normally, the energy absorbing steering column is in a state illustrated in FIG. 1. In this state, the second press-fit portion 12 of the inner tube 10 is pressed by the second supporting portion 22 of the outer tube 20. Further, the axial movement of the inner tube 10 relative to the outer tube 20 is inhibited by elastic force of the metallic elastic bush 30 at a position where the first press-fit portion 11 of the inner tube 10 faces the first supporting portion 21 of the outer tube 20.

Next, in a situation where when a load applied to the steering shaft 1 is equal to or larger than a predetermined value and the steering shaft 1 moves forward with the inner tube 10, the second press-fit portion 12 of the inner tube 10 is detached from the second supporting portion 22 of the outer tube 20 and the first press-fit portion 11 of the inner tube 10 is detached from the first supporting portion 21 of the outer tube 20. The predetermined load in this case is referred to as a load for starting a movement of the steering shaft 1 (F1). Accordingly, a portion for determining the load for starting the movement is configured from the first and second press-fit portions 11 and 12, the first and second supporting portions 21 and 22, the slit 13 and the metallic elastic bush 30. In the meantime, the load for starting the movement (F1) can be set to a desired value by adjusting at least one of a shape and a size of the second press-fit portion 12, a thickness of the inner tube 10, a thickness of the metallic elastic bush 30, the number of the spring portions 33 and a height of each spring portion 33. In addition, the load for starting the movement can be set to a stable and appropriate value without an occurrence of time change and temperature change of the load for starting the movement.

In a situation where a still larger load is applied to the steering shaft 1, the plate 40 moves forward while being guided by the guiding portion 23 and the guiding portion 2a. During that time, the plate 40 plastically deforms and slides along the outer surface of the guiding portion 23 at a bent portion side. Accordingly, a state illustrated in FIG. 1 turns to a state indicated by a solid line illustrated in FIG. 13 while so called an ironing load is applied. In other words, in this embodiment, a portion for applying a load during the movement is configured from the plate 40, the guiding portion 23 and the guiding portion 2a. The ironing load can be set to a desired value by adjusting at least either one of a width and a thickness of the plate 40. Further, the ironing load can be set to a desired value by forming a protrusion, a recessed portion, a notch, or the like, at the plate 40. In the meantime, a position (stroke) of the steering shaft 1, from which the ironing load is applied, can be set by adjusting the clearance d illustrated in FIG. 1.

Figure 14:
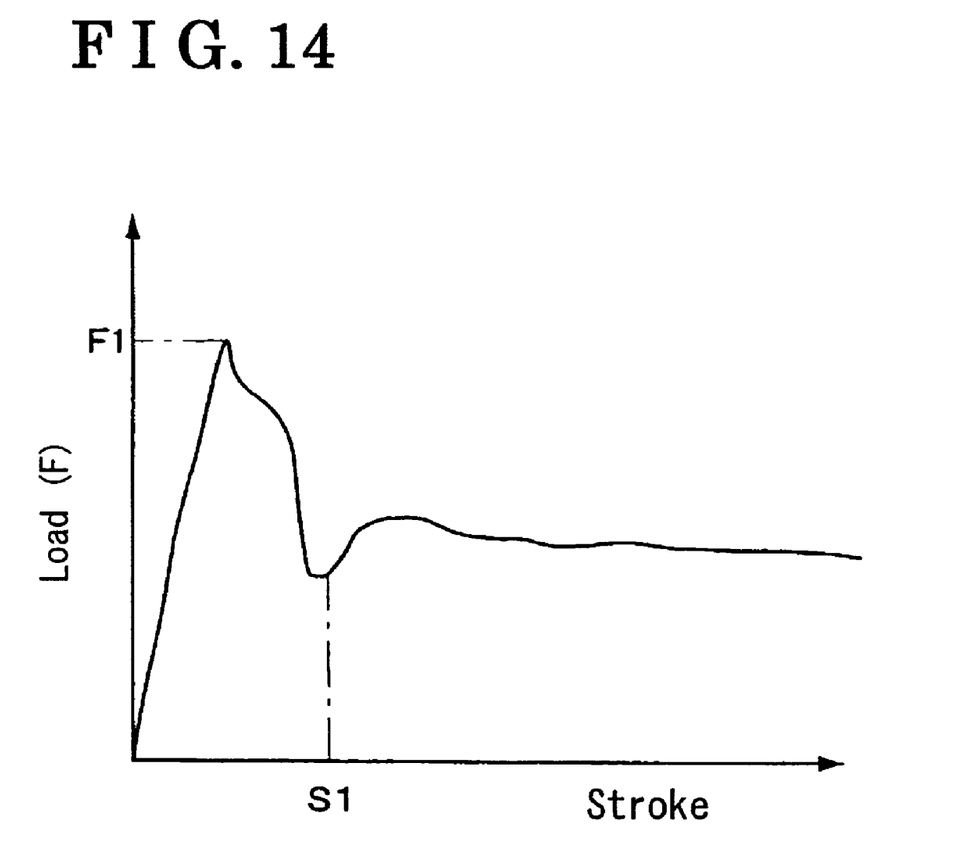
FIG. 14 represents a graph illustrating an energy absorbing property of the energy absorbing steering column according to the embodiment of the present invention.

As described above, in the energy absorbing steering column configured as above, energy absorbing property illustrated in FIG. 14 can be ensured. In other words, in a situation where a load is applied to the steering shaft 1 and the load exceeds the load for starting the movement (F1) described above, the inner tube 10 starts moving relative to the outer tube 20. In other words, the inner tube 10 moves relative to the outer tube 20 in an axial direction against frictional force between the second press-fit portion 12 of the inner tube 10 and the second supporting portion 22 of the outer tube 20, frictional force between the metallic elastic bush 30 and the first press-fit portion 11 and frictional force between the metallic elastic bush 30 and the first supporting portion 21. In a situation where the steering shaft 1 moves over a predetermined position (stroke), the steering shaft 1 turns to a free state.

Further, after the steering shaft 1 moves (strokes) by the clearance d between the inner surface of the bent portion of the plate 40 and the outer surface of the bent portion of the guiding portion 23 (after stroke S1), the ironing load is applied. The inner tube 10 moves relative to the outer tube 20 with the steering shaft 1 in a state where an approximately constant load is applied to the steering shaft 1 by the portion for applying the load during the movement described above. As a result, energy is appropriately absorbed while the steering shaft 1 is moving (stroking).

As described above, in the energy absorbing steering column described above, the portion for determining the load for starting the movement is configured from the first and second press-fit portions 11 and 12, the first and second supporting portions 21 and 22, the slit 13 and the metallic elastic bush 30. The portion for applying the load during the movement is configured from the plate 40, the guiding portion 23 and the guiding portion 2a. Accordingly, the load for starting the movement and the load during the movement in the axial movement of the inner tube 10 relative to the outer tube 20 can be separately set. Further, the load for starting the movement can be easily and appropriately set by appropriately setting a shape, a size and a thickness of the slit 13 of the second press-fit portion 12, and by setting the number of the spring portions 33 of the metallic elastic bush 30 and a height of each spring portion 33 to an appropriate value.

In the meantime, it is possible to configure the portion for determining the load for starting the movement from only the second press-fit portion 12, the second supporting portion 22 and the slit 13. Further, it is also possible to configure the portion for determining the load for starting the movement from only the first press-fit portion 11, the first supporting portion 21 and the metallic elastic bush 30. Then, either of the so-configured portions for determining the load for starting the movement can be combined with the portion for applying the load during the movement described above.

According to a first aspect of the present invention, an energy absorbing steering column includes a first cylindrical member for accommodating a steering shaft of a vehicle and rotatably supporting the steering shaft about an axis thereof, the first cylindrical member including a first press-fit portion formed on an outer surface thereof at a predetermined distance in an axial direction from a front open end of the first cylindrical member relative to the vehicle, a second cylindrical member for accommodating the first cylindrical member and normally supporting the first cylindrical member at a predetermined position, the second cylindrical member including a first supporting portion formed on an inner surface thereof near a rear open end of the second cylindrical member relative to the vehicle, and a metallic elastic bush provided between the first press-fit portion and the first supporting portion for applying elastic force in a radial direction for biasing the first press-fit portion and the first supporting portion in the radial direction for supporting the steering shaft to restrict an axial movement of the first cylindrical member relative to the second cylindrical member. The metallic elastic bush allows the axial movement of the first cylindrical member relative to the second cylindrical member when a predetermined or larger load is applied to the steering shaft.

In the energy absorbing steering column according to the first aspect, according to a second aspect of the present invention, it is possible that the second cylindrical member includes a second supporting portion formed on the inner surface thereof at a position by a predetermined distance apart from the rear open end thereof relative to the vehicle in an axial direction, the first cylindrical member includes a second press-fit portion formed on the outer surface thereof near the front open end relative to the vehicle and a notch portion cut off by a predetermined area near the front open end thereof relative to the vehicle in an axial direction, the predetermined area including a part of the second press-fit portion, and the second press-fit portion biases the second supporting portion in a radial direction for supporting the steering shaft to restrict the axial movement of the first cylindrical member relative to the second cylindrical member.

In the energy absorbing steering column according to either one of the first and second aspects, according to a third aspect of the present invention, it is preferable that each of the first and second supporting portions includes a ring-shaped protruding portion provided on the inner surface of the second cylindrical member.

In the energy absorbing steering column according to any one of the first to third aspects, according to a fourth aspect of the present invention, it is preferable that the metallic elastic bush includes a cylindrical portion having an opening along an axial direction thereof, a flange portion outwardly extending from an opening axial end of the cylindrical portion in a radial direction and a plurality of spring portions formed at the cylindrical portion in a circumferential direction. Further, according to a fifth aspect, it is preferable that the spring portions formed at the metallic elastic bush include protruding portions outwardly extending from the cylindrical portion in a radial direction between plural axial openings formed at the cylindrical portion in a circumferential direction at predetermined distances.

In the energy absorbing steering column according to any one of the first to fifth aspects, according to a sixth aspect of the present invention, it is possible that the first cylindrical member includes a recessed portion formed at a lower part thereof over a predetermined area in an axial direction relative to the second cylindrical member and an elongated plate member fixed at the recessed portion, the second cylindrical member includes a guiding portion extending from the rear open end thereof relative to the vehicle as a unit and bent in a C-shape opening downward as seen from the rear open end side thereof relative to the vehicle, the plate member is accommodated in a space between the first cylindrical member and the second cylindrical member and a free end portion of the bent plate member is inserted into the guiding portion so that the free end portion of the plate member is freely supported. In addition, according to a seventh aspect of the present invention, it is possible that the energy absorbing steering column includes a column housing for accommodating and supporting the second cylindrical member, the column housing including a second guiding portion having an axial opening at a position facing an axial opening of the guiding portion, and the free end portion of the plate member is inserted into the guiding portion and the second guiding portion so that the free end portion of the plate member is freely supported.

According to the first aspect of the present invention, the energy absorbing steering column includes the metallic elastic bush provided between the first press-fit portion of the first cylindrical member and the first supporting portion of the second cylindrical member for applying elastic force in a radial direction. The metallic elastic bush biases the first press-fit portion and the first supporting portion in the radial direction for supporting the steering shaft to restrict the axial movement of the first cylindrical member relative to the second cylindrical member. Accordingly, a load for starting the axial movement of the first cylindrical member relative to the second cylindrical member can be easily and appropriately set. Further, in the energy absorbing steering column according to the second aspect, the first cylindrical member includes the notch portion cut off by the predetermined area near the front open end thereof relative to the vehicle in an axial direction, the predetermined area including the part of the second press-fit portion. The first cylindrical portion biases the second supporting portion of the second cylindrical member in a radial direction for supporting the steering shaft to restrict the axial movement of the first cylindrical member relative to the second cylindrical member. Accordingly, the load for starting the axial movement of the first cylindrical member relative to the second cylindrical member can be easily and appropriately set. Further, in a situation where the steering shaft moves over a predetermined position (stroke), biasing forces applied by the metallic elastic bush and the first cylindrical portion cease and the steering shaft turns to a free state. Accordingly, a load during the movement can be easily set with use of another means.

Further, as in the third aspect, if each of the first and second supporting portions is configured from the ring-shaped protruding portion, each of the first and second supporting portions can be easily formed in the second cylindrical member. If the metallic elastic bush is configured according to the fourth aspect, the load for starting the movement can be easily and appropriately set. Further, if the metallic elastic bush is configured according to the fifth aspect, the load for starting the movement can be further easily and appropriately set by the metallic elastic bush.

If the energy absorbing steering column described above is configured according to the sixth aspect, the load during the axial movement of the first cylindrical member relative to the second cylindrical member can be easily and appropriately set. In particular, if the energy absorbing steering column is configured according to the seventh aspect, the plate member can be reliably supported and guided by the guiding portion of the second cylindrical member and the second guiding portion of the column housing.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An energy absorbing steering column, comprising:
   a first cylindrical member for accommodating a steering shaft of a vehicle and rotatably supporting the steering shaft about an axis thereof, the first cylindrical member including a first press-fit portion formed on an outer surface thereof at a predetermined distance in an axial direction from a front open end of the first cylindrical member relative to the vehicle;
   a second cylindrical member for accommodating the first cylindrical member and normally supporting the first cylindrical member at a predetermined position, the second cylindrical member including a first supporting portion formed on an inner surface thereof near a rear open end of the second cylindrical member relative to the vehicle; and
   a metallic elastic bush provided between the first press-fit portion and the first supporting portion for applying elastic force in a radial direction for biasing the first press-fit portion and the first supporting portion in the radial direction for supporting the steering shaft to restrict an axial movement of the first cylindrical member relative to the second cylindrical member, wherein
   the metallic elastic bush allows the axial movement of the first cylindrical member relative to the second cylindrical member when a load applied to the steering shaft is equal to or larger than a predetermined value, and
   each of the first and second supporting portions includes a ring-shaped protruding portion provided on the inner surface of the second cylindrical member.

2. The energy absorbing steering column according to claim 1, wherein
   the second cylindrical member comprises a second supporting portion formed on the inner surface thereof at a position located a predetermined distance apart from the rear open end thereof relative to the vehicle in an axial direction, the first cylindrical member comprises a second press-fit portion formed on the outer surface thereof near the front open end relative to the vehicle and a notch portion cut off by a predetermined area near the front open end thereof relative to the vehicle in an axial direction, the predetermined area including a part of the second press-fit portion, and the second press-fit portion biases the second supporting portion in a radial direction for supporting the steering shaft to restrict the axial movement of the first cylindrical member relative to the second cylindrical member.

3. The energy absorbing steering column according to claim 2, wherein
   the metallic elastic bush comprises a cylindrical portion having an opening along an axial direction thereof, a flange portion outwardly extending from an opening axial end of the cylindrical portion in a radial direction and a plurality of spring portions formed at the cylindrical portion in a circumferential direction.

4. The energy absorbing steering column according to claim 3, wherein
   the spring portions formed at the metallic elastic bush include protruding portions outwardly extending from the cylindrical portion in a radial direction between plural axial openings formed at the cylindrical portion in a circumferential direction at predetermined distances.

5. The energy absorbing steering column according to claim 3, wherein the first cylindrical member comprises a recessed portion formed at a lower part thereof over a predetermined area in an axial direction relative to the second cylindrical member and an elongated plate member fixed at the recessed portion, the second cylindrical member comprises a guiding portion extending from the rear open end thereof relative to the vehicle and having a C-shape opening downward as seen from the rear open end side thereof relative to the vehicle, the plate member is accommodated in a space between the first cylindrical member and the second cylindrical member and a free end portion of the plate member is bent and inserted into the guiding portion so that the free end portion of the plate member is freely supported.

6. The energy absorbing steering column according to claim 2, wherein the first cylindrical member comprises a recessed portion formed at a lower part thereof over a predetermined area in an axial direction relative to the second cylindrical member and an elongated plate member fixed at the recessed portion, the second cylindrical member comprises a guiding portion extending from the rear open end thereof relative to the vehicle and having a C-shape opening downward as seen from the rear open end side thereof relative to the vehicle, the plate member is accommodated in a space between the first cylindrical member and the second cylindrical member and a free end portion of the plate member is bent and inserted into the guiding portion so that the free end portion of the plate member is freely supported.

7. The energy absorbing steering column according to claim 6, further comprising a column housing for accommodating and supporting the second cylindrical member, the column housing including a second guiding portion having an axial opening at a position facing an axial opening of the guiding portion, wherein the free end portion of the plate member is inserted into the guiding portion and the second guiding portion so that the free end portion of the plate member is freely supported.

8. The energy absorbing steering column according to claim 1, wherein the metallic elastic bush comprises a cylindrical portion having an opening along an axial direction thereof, a flange portion outwardly extending from an opening axial end of the cylindrical portion in a radial direction and a plurality of spring portions formed at the cylindrical portion in a circumferential direction.

9. The energy absorbing steering column according to claim 8, wherein the spring portions formed at the metallic elastic bush include protruding portions outwardly extending from the cylindrical portion in a radial direction between plural axial openings formed at the cylindrical portion in a circumferential direction at predetermined distances.

10. The energy absorbing steering column according to claim 9, wherein the first cylindrical member comprises a recessed portion formed at a lower part thereof over a predetermined area in an axial direction relative to the second cylindrical member and an elongated plate member fixed at the recessed portion, the second cylindrical member comprises a guiding portion extending from the rear open end thereof relative to the vehicle and having a C-shape opening downward as seen from the rear open end side thereof relative to the vehicle, the plate member is accommodated in a space between the first cylindrical member and the second cylindrical member and a free end portion of the plate member is bent and inserted into the guiding portion so that the free end portion of the plate member is freely supported.

11. The energy absorbing steering column according to claim 1, wherein the first cylindrical member comprises a recessed portion formed at a lower part thereof over a predetermined area in an axial direction relative to the second cylindrical member and an elongated plate member fixed at the recessed portion, the second cylindrical member comprises a guiding portion extending from the rear open end thereof relative to the vehicle and having a C-shape opening downward as seen from the rear open end side thereof relative to the vehicle, the plate member is accommodated in a space between the first cylindrical member and the second cylindrical member and a free end portion of the plate member is bent and inserted into the guiding portion so that the free end portion of the plate member is freely supported.

* * * * *